United States Patent
Mercer et al.

(10) Patent No.: US 6,351,892 B1
(45) Date of Patent: Mar. 5, 2002

(54) ORIENTATION SENSOR UTILIZING INTRA-PATTERN PROPERTY MEASUREMENTS

(75) Inventors: John E. Mercer, Kent; Rudolf Zeller, Seattle, both of WA (US)

(73) Assignee: Digital Control Incorporated, Renton, WA (US)

(*) Notice: Subject to any disclaimer, the term of this patent is extended or adjusted under 35 U.S.C. 154(b) by 0 days.

(21) Appl. No.: 09/461,936

(22) Filed: Dec. 15, 1999

(51) Int. Cl.[7] .................................................. G01C 9/06
(52) U.S. Cl. .................................... 33/366.15; 33/366.11
(58) Field of Search ............................... 33/366.15, 328, 33/366.11, 366.12, 366.14, 366.18, 366.19, 366.21, 366.22, 366.25, 366.26

(56) References Cited

U.S. PATENT DOCUMENTS

| | | | | |
|---|---|---|---|---|
| 4,028,815 A | * | 6/1977 | Buckley et al. | 33/366.21 |
| 4,167,818 A | * | 9/1979 | Cantarella et al. | 33/366.22 |
| 4,422,243 A | * | 12/1983 | Brunson et al. | 33/366.12 |
| 4,811,491 A | * | 3/1989 | Phillips et al. | 33/366.12 |
| 4,846,954 A | * | 7/1989 | Ryan et al. | 33/366.22 |
| 5,479,716 A | * | 1/1996 | Murphy | 33/366.19 |
| 5,852,878 A | * | 12/1998 | Seipp, Jr. et al. | 33/366.11 |

* cited by examiner

*Primary Examiner*—Christopher W. Fulton
(74) *Attorney, Agent, or Firm*—Michael Pritzkau (57) ABSTRACT

An orientation sensor capable of generating at least one output signal indicative of a particular orientation parameter is described. The orientation sensor comprises a sensor housing defining a closed internal chamber including a first internal surface. The first internal surface supports a first electrically conductive pattern which itself forms part of a sensing arrangement The first electrically conductive pattern includes an arrangement of electrically isolated segments in a predetermined configuration. A flowable material is contained within the internal chamber, which flowable material contacts a portion of the first internal surface dependent upon the value of the particular orientation parameter. An electrical property is measurable between the segments such that the orientation parameter can be determined using the output signal based only on the electrical property and, therefore, only on the portion of the first internal surface contacted by the flowable material. Thus, intra-pattern measurements yield the measured property without the need for conductive members distributed along the length of the chamber. A combination pitch/roll sensor is described in which a single electrically conductive pattern cooperates with the flowable material so as to produce independent electrical signals corresponding to the pitch and roll of the housing. In one aspect, first and second electrically conductive patterns are provided at opposing ends of a flowable material chamber. Use of signals from the patterns results in ratiometric cancellation of temperature error.

42 Claims, 4 Drawing Sheets

ORIENTATION SENSOR UTILIZING INTRA-PATTERN PROPERTY MEASUREMENTS

BACKGROUND OF THE INVENTION

The present invention relates generally to the field of orientation sensors and, more particularly, to an orientation sensor including a conductive pattern including isolated conductive segments configured for segment to segment (hereinafter intra-pattern) property measurements useful in establishing one or more orientation parameters. The sensor is suitable for use in applications such as, for example, monitoring a remotely controlled underground boring device.

A number of orientation sensors have been designed especially for use in remote controlled underground boring devices. As will be seen, these prior art devices have shared a basic design concept.

Figure 1:
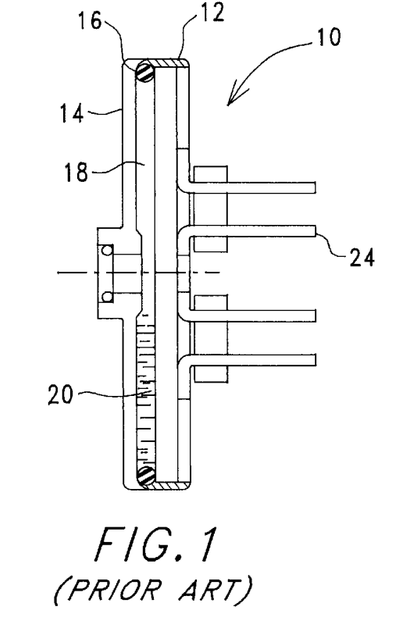
FIGS. 1 and 2 are prior art figures taken directly from U.S. Pat. No. 5,174,033 for use in conjunction with the discussion of the prior art appearing above.
Figure 2:
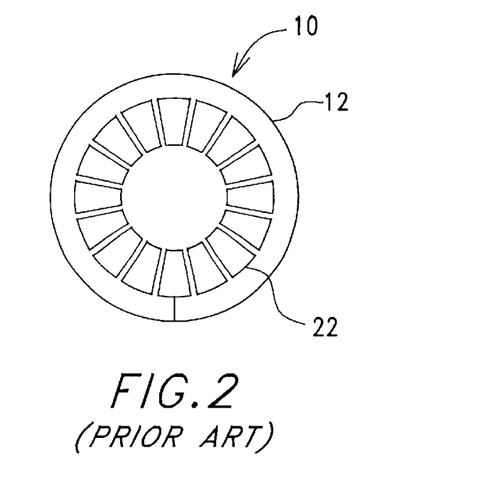

One example of a prior art orientation sensor in the form of a roll sensor is disclosed in U.S. Pat. No. 5,174,033 (Rider). FIGS. 1 and 2 are partial reproductions of FIGS. 4 and 5, respectively, of the Rider patent. FIG. 1 shows a roll sensor generally indicated by the reference number 10. Sensor 10 includes a substrate 12 and a cup-shaped member 14 which is sealed to substrate 12 by an O-ring 16 in a way which defines a cavity 18. A conductive fluid 20 is contained by cavity 18.

Attention is now directed to FIG. 2 in conjunction with FIG. 1. FIG. 2 illustrates a plurality of capacitor electrode plates 22 which are formed on the inner surface of substrate 12. Electrical connections to capacitor electrode plates 22 are accomplished via a plurality of electrically conductive leads 24. Cup-shaped member 14 serves as a grounded electrode common to all of electrode plates 22. During operation, roll sensor 10 is designed to spin in the plane of FIG. 2, oriented such that gravity causes fluid 20 to continuously flow into the bottom portion of the cavity (FIG. 1). The roll orientation of sensor 10 is determined by measuring the capacitance between individual electrode plates 22 and cup-shaped member 14 as influenced by fluid 20. It is important to note that measurements are taken, in essence, between the ends of the device. Moreover, it is submitted that prior art orientation sensors, in general, operate under the concept of using measurements taken along the length of the device. That is, by using electrically conductive members positioned at least at the ends of the device and/or centered therebetween or at other intermediate locations. For other examples, see U.S. Pat. Nos. 4,674,579, 4,714,118 and 5,726,359. As will be seen, the present invention eliminates the need for an implementation having electrodes at both ends of a device or spaced apart therebetween, introducing a highly advantageous and heretofore unseen configuration useful in measuring pitch and/or roll.

SUMMARY OF THE INVENTION

As will be described in more detail hereinafter, there is disclosed herein an orientation sensor capable of generating at least one output signal indicative of a particular orientation parameter. The orientation sensor comprises a sensor housing defining a closed internal chamber including a first internal surface. The first internal surface supports a first electrically conductive pattern which itself forms part of a sensing arrangement. The first electrically conductive pattern includes an arrangement of electrically isolated segments in a predetermined configuration. A flowable material is contained within the internal chamber, which flowable material contacts a portion of the first internal surface dependent upon the value of the particular orientation parameter.

In one aspect of the invention, an electrical property is measurable between the segments such that the orientation parameter can be determined using the output signal based only on the electrical property and, therefore, only on the portion of the first internal surface contacted by the flowable material. Thus, intra-pattern measurements yield the measured property without the need for conductive members distributed along the length of the chamber.

In another aspect of the invention, the particular orientation parameter is pitch. In this instance, a first electrically conductive pattern includes first and second electrically isolated segments defining a gap therebetween on the first internal surface such that the value of the electrical property is in proportion to an area of the gap covered by the flowable material between the first and second segments which, in turn, is in proportion to the pitch so as to cause the value of the electrical property between the first and second segments to change in response to changes in pitch.

In still another aspect of the invention, the particular orientation parameter is roll angle. In this instance, the first electrically conductive pattern includes at least first and second electrically isolated segments defining a first roll sensing gap therebetween on the first internal surface such that the value of the electrical property is in proportion to an area of the roll sensing gap covered by the flowable material between the first and second segments which, in turn, is in proportion to the roll so as to cause the value of the electrical property between the first and second segments to change in response to changes in roll. In one feature, the electrically conductive pattern defines a plurality of roll sensing gaps, each of which covers a particular range of roll positions of the orientation sensor. In one preferred embodiment, the electrically conductive pattern defines three roll sensing gaps that are configured so as to substantially surround a common center point about which the orientation sensor experiences roll. Each roll sensing gap is used to produce an output such that the roll position of the orientation sensor is unambiguously identifiable either statically or dynamically.

In yet another aspect of the present invention, an orientation sensor is provided which is capable of generating at least two output signals indicative of a particular orientation parameter. The orientation sensor comprises a sensor housing defining a closed internal chamber having first and second opposing internal surfaces. A first electrically conductive pattern is supported by the first internal surface and a second electrically conductive pattern is supported by the second internal surface. The first electrically conductive pattern includes a first plurality of electrically isolated segments in a first predetermined configuration while the second electrically conductive pattern includes a second plurality of electrically isolated segments in a second predetermined configuration. A flowable material is contained within the internal chamber such that the flowable material contacts first and second portions, respectively, of the first and second internal surfaces. The respective areas of the first and second portions contacted by the flowable material are dependent upon the value of the particular orientation parameter in a way which influences an electrical property measurable between the segments disposed on the first and second surfaces such that the first electrically conductive pattern produces at least a first output signal and the second electrically conductive pattern produces at least a second output signal. In one feature of the present invention, each pattern produces its output signal substantially independent of the other pattern based on contact with the flowable material.

In another feature of the present invention, the first and second electrically conductive patterns are identical and identically oriented such that combined use of the output signals to determine the value of the orientation parameter produces ratiometric cancellation of temperature error.

In one implementation according to the present invention, a combination pitch and roll orientation sensor is provided having a housing containing a flowable material which flows in the housing in response to the pitch and roll orientation of the housing. An electrical arrangement includes a single electrically conductive pattern cooperating with the flowable material so as to produce independent electrical signals corresponding to the pitch and roll of the housing.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 3:
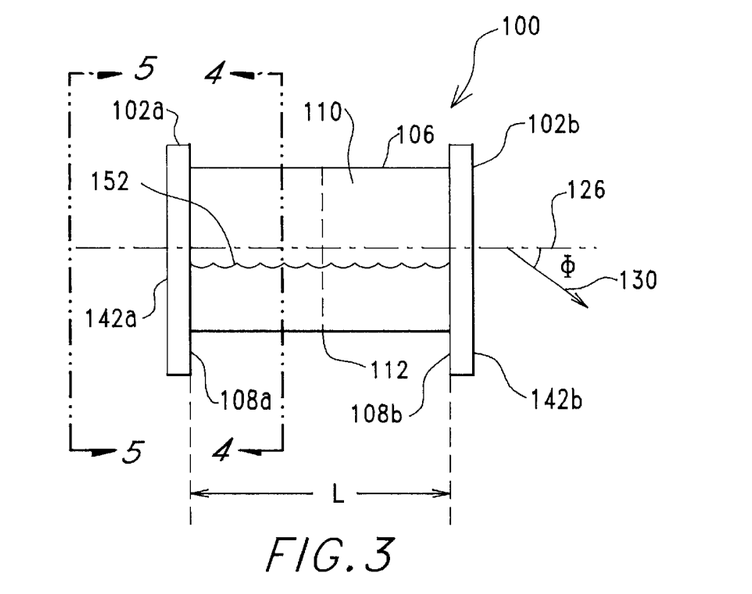
FIG. 3 is a diagrammatic side view of an orientation sensor manufactured in accordance with the present invention, shown here to illustrate general aspects of its highly advantageous structure.

Having described FIGS. 1 and 2 previously, attention is immediately directed to FIG. 3 which illustrates an orientation sensor manufactured in accordance with the present invention and generally indicated by the reference numeral 100. It is noted that dimensions in FIG. 3 have been exaggerated for illustrative purposes. Sensor 100 is made up of first and second printed circuit boards 102a and 102b, respectively. A cylindrical tube 106 includes openings which are sealed to the inner facing surfaces 108a and 108b of each of the printed circuit boards so as to define a cavity 110. Tube 106 may be formed, for example, from quartz or from other such suitable materials. In this preferred embodiment, printed circuit boards 102a and 102b are identical to one another, as well as being identically oriented at either end of tube 106. It is to be understood, however, that an effective orientation sensor may be produced using only one of these printed circuit boards by sealing off tube 106, for example, at the location of a dashed line 112, which is described in further detail below.

Figure 4:
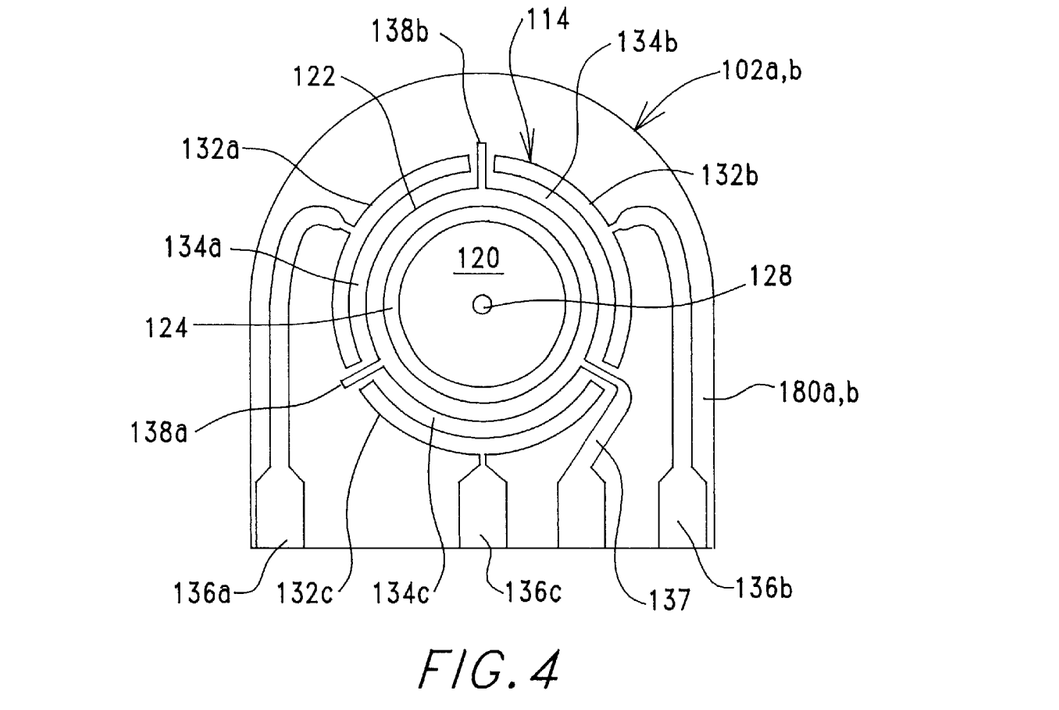
FIG. 4 is a diagrammatic illustration of one of two identical printed circuit boards used in the orientation sensor of FIG. 3, shown here to illustrate the overall outline of the boards in conjunction with a highly advantageous electrically conductive sensing pattern that is defined on the depicted side of each board.

Attention is now directed to FIGS. 3 and 4. The latter figure illustrates a printed circuit board pattern 114 that is formed on inner sides 108a and 108b of each of printed circuit boards 102a and 102b. The overall outline of the printed circuit boards is a "tombstone" configuration, however, it should be appreciated that any suitable outline may be used so long as measurements can be obtained in accordance with the teachings herein. Pattern 114 defines a highly advantageous configuration made up of individual, electrically isolated segments including one combination of segments for sensing pitch and another combination of segments for sensing roll. Specifically, a first segment 120 and a second segment 122 comprise a pitch sensing arrangement defining a pitch sensing gap 124. The first segment comprises a circular shape with its center located at center point 128. Alternatively, segment 120 could comprise a ring shape or other such suitable form Second segment 122 comprises a ring shape which is likewise centered on center point 128 such that its innermost edge is equidistant from the edge of segment 120 about its periphery. During operation, orientation sensor 100 is designed to be mounted, for example, in the drill head of a boring tool such that roll takes place about an axis 126 (FIG. 3) which passes through the center point 128 (FIG. 3) of each of printed circuit boards 102a and 102b. Pitch, on the other hand, is measured in terms of the angle $\phi$, as indicated in FIG. 3, wherein an arrow 130 represents a horizontal orientation.

Still referring to FIGS. 3 and 4, the roll sensing combination of segments comprises segment 122 along with segments 132a–c so as to define first, second and third roll sensing gaps 134a–c, respectively, which serve to surround center point 128. Each of segments 132a–c is spaced uniformly apart from segment 122 by virtue of an appropriate radius centered upon center point 128. Therefore, each roll sensing gap covers an arc of somewhat less than 120° and is arcuate in form having a constant width. External connections are made via connection pads 136a–c wherein pads 136a–c are connected to roll sensing segments 132a–c while pad 137 is connected to segment 122. The connection pads are electrically connected with their associated segments by appropriately configured traces. For purposes of clarity, the traces are identified using the appropriate connection pad reference number. It is noted that segment 122 includes projections 138a and 138b. These projections serve to equalize roll signals obtained from the different roll sensing segments by approximating that portion of trace 137 which extends between roll sensing segments 132b and 132c.

Attention is now directed to FIGS. 3 and 4. The latter figure illustrates a printed circuit board pattern 114 that is formed on inner sides 108a and 108b of each of printed circuit boards 102a and 102b. The overall outline of the printed circuit boards is a "tombstone" configuration, however, it should be appreciated that any suitable outline may be used so long as measurements can be obtained in accordance with the teachings herein. Pattern 114 defines a highly advantageous configuration made up of individual, electrically isolated segments including one combination of segments for sensing pitch and another combination of segments for sensing roll. Specifically, a first segment 120 and a second segment 122 comprise a pitch sensing arrangement defining a pitch sensing gap 124. The first segment comprises a circular shape with its center located at center point 128. Alternatively, segment 120 could comprise a ring shape or other such suitable form. Second segment 122 comprises a ring shape which is likewise centered on center point 128 such that its innermost edge is equidistant from the edge of segment 120 about its periphery. During operation, orientation sensor 100 is designed to be mounted, for example, in the drill head of a boring tool such that roll takes place about an axis 126 (FIG. 3) which passes through the center point 128 (FIG. 4) of each of printed circuit boards 102a and 102b. Pitch, on the other hand, is measured in terms of the angle φ, as indicated in FIG. 3, wherein an arrow 130 represents a horizontal orientation.

Figure 5:
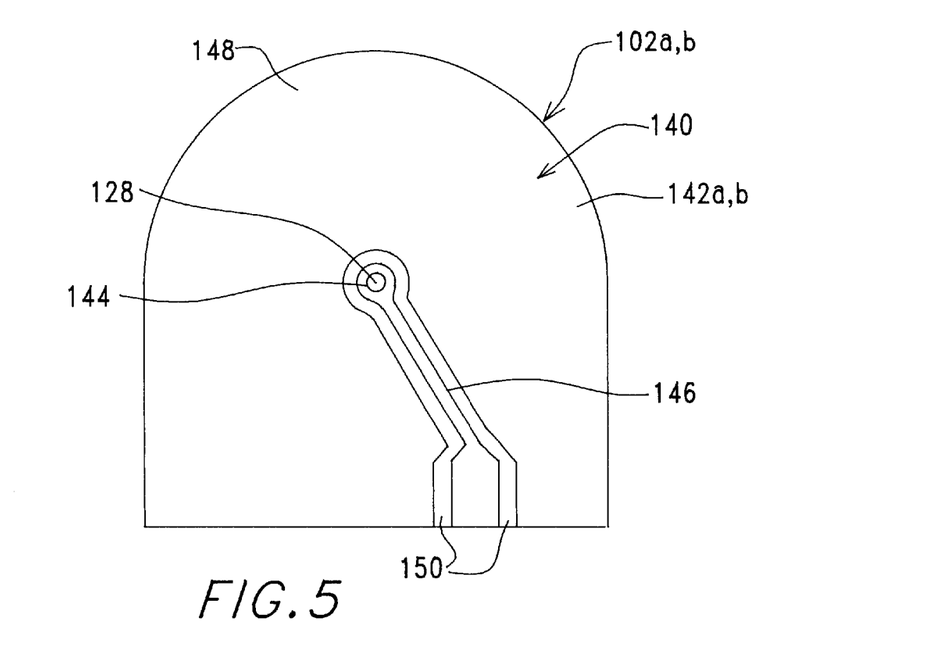
FIG. 5 is a diagrammatic illustration showing an electrically conductive pattern formed on the side of the printed circuit boards opposing the side depicted in FIG. 4.

Still referring to FIGS. 3–5, chamber 106 is partially filled with a flowable material such as, for example, a suitable conductive fluid 152 which is selected to function in the manner to be described. The fluid may readily be injected, for example, into chamber 106 through feed-through 144 of printed circuit board 102a while air is allowed to escape from the feed-through of printed circuit board 102b. Thereafter, the feed-throughs may be sealed using any suitable material such as, for example, silicone sealant. One useful conductive fluid has been found to be glycerin with a small quantity of saline solution added to provide for conductivity, as described in U.S. Pat. Nos. 5,155,442, 5,337,002, 5,444,382 and 5,726,359 which are incorporated herein by reference. In order to function in the manner intended, and at the same time, optimize contact with patterns 114 on surfaces 108a and 108b, chamber 106 is filled with conductive fluid 152 to a predetermined level. As will be seen, the predetermined fluid level should be selected in view of several considerations with regard to establishing an operational range of orientations to be detected. Thus, conductivity, as measured between any pair of segments defining a sensing gap, will vary based upon the portion of the sensing gap in direct contact with the conductive fluid. It is important to understand that flowable materials that enable measurement of electrical characteristics other than conductivity (such as capacitance and inductance) may also be used in chamber 110. For instance, materials having dielectric characteristics are well suited wherein capacitance measured between the segments of electrically conductive pattern 114 varies in accordance with the portion of the fluid contacting the respective sensing gap. One example of a material having such dielectric characteristics is liquid silicone.

Figure 6:
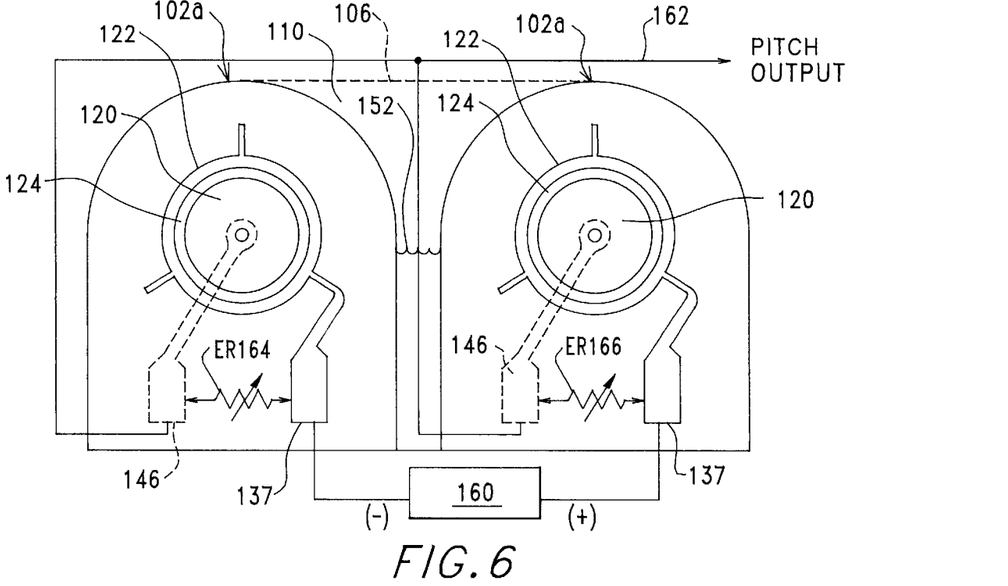
FIG. 6 is a diagrammatic/schematic illustration showing one highly advantageous manner of electrically interconnecting the printed circuit boards of the orientation sensor of FIG. 3 for purposes of measuring pitch orientation.

Having generally described the structure of orientation sensor 100, the pitch aspect of its operation will be described with reference to FIGS. 3 and 6. For any particular pitch orientation within a predetermined operational range, some portion of each pitch sensing gap 124 will be contacted by conductive fluid 152. FIG. 6 diagrammatically illustrates printed circuit boards 102a and 102b along with external electrical connections in a configuration for purposes of sensing pitch. The illustrated pitch measurement configuration utilizes a voltage source 160 having a positive (+) terminal electrically connected to connection pad 137 of printed circuit board 102b and a negative terminal (−) connected to pad 137 of printed circuit board 102a. For purposes of illustrations only this is shown as a direct current source. In actual practice, the source would be alternating in order to avoid electrolytic damage to the conductive fluid 152 and/or other parts of the orientation sensor 100. Connection pads 146 of printed circuit boards 102a and 102b are electrically connected with one another and a pitch output 162 is taken from this connection. The variable resistivities between segments 120 and 122 of printed circuit boards 102a and 102b caused by contact of conductive fluid 152 with pitch sensing gaps 124 of the respective printed circuit boards are illustrated by equivalent variable resistors ER164 and ER166. It is to be understood that these equivalent variable resistors each represent a lumped resistance corresponding to the actual, distributed resistance produced by the corresponding pitch sensing gap in contact with conductive fluid 152. Thus, in operation, the sensor illustrated in FIG. 6 functions as equivalent variable resistors ER164 and ER166 connected in series with one another across voltage source 160.

Continuing to refer to FIGS. 3–5, it should be appreciated that the illustrated pitch sensing arrangement is highly advantageous. Specifically, orientation sensor 100 is configured for roll about axis 126. Segments 120 and 122 of each printed circuit board, therefore, define pitch sensing gap 124 in such a way that the gap surrounds center point 128. Additionally, pitch sensing gap 124 is circular in configuration and centered on center point 128 so that contact of the pitch sensing gap with conductive fluid 152 is constant irrespective of roll about axis 126 (assuming the proper characteristics of fluid 152, as described above). Therefore, printed circuit boards 102a and 102b provide a constant pitch output signal for a fixed pitch orientation, which output signal is independent of roll. It should be appreciated that the pitch sensing gap may be configured depending on the specific intended application. For example, in a pitch sensor which is not subjected to roll, in normal use the pitch sensing gap may be defined as a "stripe" having a vertical component of orientation. Any configuration of pitch sensing gap is suitable in this regard so long as the area of the gap contacted by conductive fluid 152 is proportional to pitch orientation.

Still considering the pitch orientation measurement configuration illustrated in FIG. 6, it is important to understand that each printed circuit board produces a pitch signal independent of the other board. That is, each board measures pitch based solely on the resistivity present between segments 120 and 122 of pattern 114. In essence, the measurements are taken in the plane of each printed circuit pattern. Therefore, as mentioned previously, only one of printed circuit boards 102a and 102b is necessary for producing a pitch measurement. Applicants submit that such a configuration has not been seen in the prior art. Accordingly, an effective pitch sensor may be implemented by closing chamber 110 at aforementioned line 112 such that the chamber is defined between this line and printed circuit board 102a. The concept of independently produced measurements provides significant advantages over the prior art for reasons to be described.

As discussed above, prior art orientation sensors require electrodes that are positioned at opposing ends of a chamber (see FIGS. 1 and 2) and possibly centered or at other intermediate positions between the ends of the chamber (not shown). Accordingly, such prior art arrangements measure the electrical property of interest as distributed along the length of the chamber. The entirety of the chamber is thus involved in obtaining the desired measurement. In contrast, because the electrically conductive pattern of the present invention independently produces its measurement, the entirety of the flowable medium chamber is not involved in generating the desired orientation signal. That is, measurements are localized at each printed circuit board. In and by itself, it is submitted that this feature provides a heretofore unseen opportunity for improvement in the accuracy of an orientation sensor using a single flowable medium chamber. The significance of such independent readings will be described immediately hereinafter.

Referring again to FIGS. 3–5, it should be appreciated that the electrical interconnection of printed circuit boards 102a and 102b in FIG. 6 utilizes the independently produced pitch signal of each board in a highly advantageous way. Specifically, as noted above, equivalent resistance 164 of circuit board 102a and equivalent resistance 166 of circuit board 102b are connected in series across voltage source 160 with pitch output 162 being taken at the common connection between the equivalent resistances. It should also be appreciated that measurements taken from each of the printed circuit boards are affected as a result of changes in conductivity of electrically conductive fluid 152 resulting from temperature changes. If only one printed circuit board were used, such temperature effects should be given consideration. However, in the circuit of FIG. 6, temperature equally affects the pitch signal produced by each printed circuit board. Therefore, as a result of the series connection of equivalent resistances 164 and 166, the temperature produced resistance changes are seen to essentially cancel one another. No provision other than the use of the illustrated interconnection is required in order to realize this advantage. Therefore, in accordance with the present invention, this configuration is substantially immune to temperature induced error. It should be appreciated that the described temperature cancellation effects are ratiometric in nature and are not limited to this specific configuration. That is, ratiometric cancellation will be exhibited whenever a ratio is taken between measurements produced by the printed circuit boards 102a and 102b at either end of the orientation sensor.

Although the pitch measurements produced by printed circuit boards 102a and 102b are independent of each other, it should be appreciated that, for any particular pitch angle, the different portions of each printed circuit pattern contacted by conductive fluid 152 are, in fact, interdependent. For this reason, pitch output 162 is unique for any particular pitch orientation within a specified operational range of pitch angles. Specific details will be provided for establishing a particular operational range at an appropriate point below. It should be noted that the sensitivity of the orientation sensor is proportional to the length of tube 106 (FIG. 3).

Figure 7:
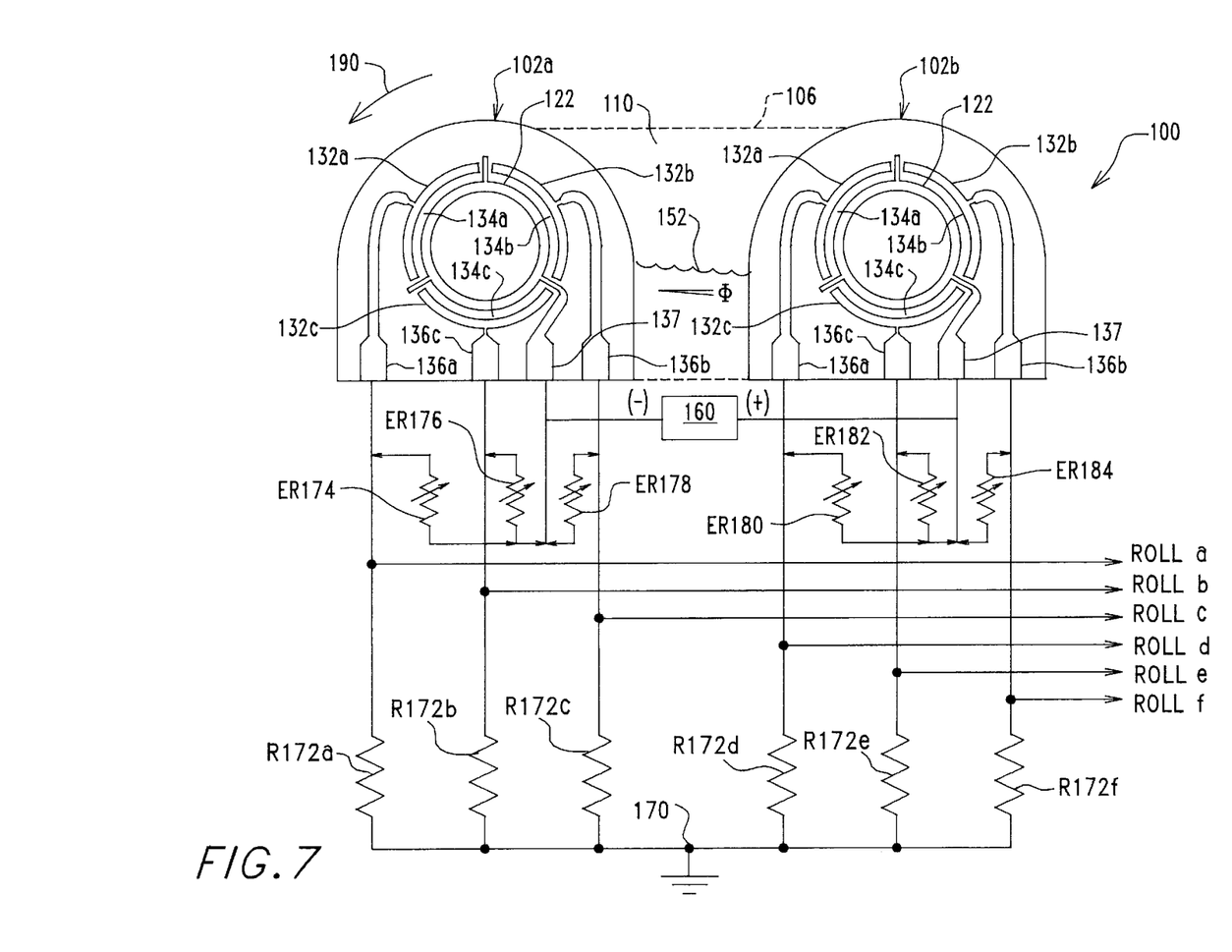
FIG. 7 is a diagrammatic/schematic illustration showing one highly advantageous manner of electrically interfacing with the printed circuit boards of the orientation sensor of FIG. 3 for purposes of measuring roll orientation, which simultaneously permits the use of the pitch measurement scheme shown in FIG. 6.

Attention is now directed to FIG. 7 in conjunction with FIGS. 3–5. FIG. 7 diagrammatically illustrates orientation sensor 100 including external electrical connections made to printed circuit boards 102a and 102b for use in sensing roll orientation. As mentioned previously, roll orientation sensing is accomplished using a particular combination of segments including segments 132a–c and segment 122, all of which cooperatively define roll sensing gaps 134a–c. The external circuitry configuration of FIG. 7 may be used simultaneously with the pitch sensing configuration of FIG. 6 such that each of printed circuit boards 102a and 102b independently produces a pitch signal, but also independently produces roll signals. To this end, voltage source 160 is applied to connection pad 137 of each printed circuit board 102a and 102b, as originally shown in FIG. 6 so as to apply voltage to segment 122 of each printed circuit board 102a and 102b. Each one of connection pads 136a–c for each printed circuit board 102a and 102b is connected to a circuit ground 170 through one of a plurality of resistors indicated by the reference numbers R172a–f, all of which have the same value. Equivalent resistances of roll sensing gaps 134a–c for printed circuit board 102a are indicated by the reference numbers ER174, ER176 and ER178, respectively, while equivalent resistances of roll sensing gaps 134a–c for printed circuit board 102b are indicated by the reference numbers ER180, ER182 and ER184, respectively. Once again, it is to be understood that each of these equivalent variable resistors represents a lumped resistance corresponding to the actual, distributed resistance produced by the corresponding roll sensing gap in contact with conductive fluid 152. Therefore, a voltage divider is formed for each roll sensing gap comprising the resistance of the pitch sensing gap in series with one of resistors R172. Six roll outputs are indicated as $ROLL_{a-f}$. For example, roll sensing gap 134a of printed circuit board 102a, having an equivalent resistance represented by ER174, is in series with resistor R172a. The corresponding roll output, $ROLL_a$, is taken from the connection of R172a and connection pad 136a.

Figure 8:
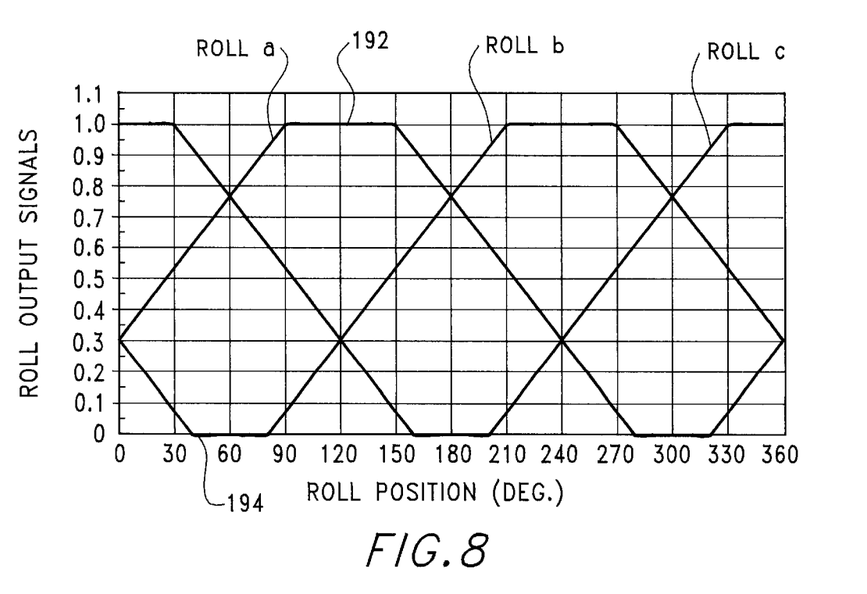
FIG. 8 is a plot illustrating normalized roll output signals from the orientation sensor and associated circuitry of FIG. 7.

Attention is now directed to FIGS. 7 and 8. FIG. 8 illustrates output signals $ROLL_{a-c}$ for counterclockwise roll in the direction indicated by an arrow 190. For purposes of clarity, output signals $ROLL_{d-f}$ (independently produced by printed circuit board 102b) have not been illustrated. The specific position of printed circuit boards 102a and 102b in FIG. 7 correspond to the roll position of 0° in FIG. 8. Chamber 106 and the level of fluid 152 are also diagrammatically shown between the two printed circuit boards. In the position shown in FIG. 7, roll sensing gap 134c is completely immersed in fluid 152. Roll sensing gap 134a is partially immersed in the fluid and is being further immersed by continuing rotation. Therefore, $ROLL_a$ exhibits a positive slope at the 0° roll position. Roll sensing gap 134b is also partially immersed in fluid, but is emerging from the fluid with rotation such that $ROLL_b$ exhibits a negative slope at the 0° roll position. It is apparent from FIG. 8 that the combination of these three roll signals unambiguously identifies the roll position of orientation sensor 100 for any particular roll orientation under both static and dynamic conditions. Moreover, the roll output waveforms of FIG. 8 contemplate the level of fluid 152 as being above center point 128 of printed circuit board 102a since positive plateaus 192 of the roll signal waveforms are longer in duration than negative plateaus 194. That is, the orientation sensor is pitched such that the roll sensing gaps are completely immersed in fluid 152 over an arc that is longer than the arc over which the roll sensing gaps are completely out of contact with the fluid. This condition may be caused, for example, by a pitch, $\phi$, of approximately –10% grade as indicated by fluid 152 which causes a greater proportion of fluid to contact printed circuit board 102a compared with the portion contacting printed circuit board 102b. The usefulness of roll signals from the second printed circuit board will be described immediately below.

Referring to FIGS. 3 and 4, the operational range of orientations over which orientation sensor 100 is useful depends upon a number of different factors including the level of fluid 152, the length, L, of chamber 110 (tube 106), the diameter of tube 106 and the widths of the various pitch and roll sensing gaps. In this regard, the overall combination of these factors cooperate interactively to establish the operational range of the sensor. An orientation sensor has been produced in accordance with this disclosure for use in a horizontal directional drilling application anticipating an operational pitch range of approximately ±100% grade. Specific dimensions of this working embodiment include tube 106 having a length, L, of approximately 0.188 inches and an inside diameter of approximately 0.375 inches. Pitch sensing gap 124 includes inner and outer diameters of approximately 0.195 inches and 0.234 inches, respectively. Roll sensing gaps 134 a–c include inner and outer diameters of approximately 0.275 inches and 0.313 inches, respectively. These dimensions may be modified in any suitable way depending upon a specific application. For example, L may be increased so as to increase the pitch sensitivity of the orientation sensor. Likewise, pitch sensitivity is increased by lowering the relative level of fluid 152. However, the effect of any modification should be considered with regard to other factors. For instance, if L is inordinately increased, the range over which fluid 152 contacts both printed circuit boards 102a and 102b will be decreased. The net result, at high pitch, may be one printed circuit board completely covered by fluid 152 while the opposing board makes no contact with fluid 152.

It should be appreciated that the roll output signals of printed circuit board 102b will essentially be identical to those obtained from printed circuit board 102a when pitch angle φ is equal to zero. In instances where φ is not equal to zero, the output signals obtained from one printed circuit board will vary from those of the other printed circuit board dependent upon the specific value of φ. Because the rotational motion of inner sides 108a and 108b of printed circuit boards 102a and 102b relative to axis 126 is opposite to one another, $ROLL_b$ of printed circuit board 102a corresponds to $ROLL_b$ of printed circuit board 102b while $ROLL_b$ of printed circuit board 102a corresponds to $ROLL_a$ of printed circuit board 102b. While both printed circuit boards 102a and 102b independently produce roll signals, the overall accuracy of orientation sensor 100 can be improved even further by utilizing the roll signals available from both printed circuit boards. For example, all six of the roll signals may be converted to digital signals using an analog to digital converter (not shown), provided to a microprocessor (not shown), and thereafter provided to a suitable arrangement, such as a display (not shown) for calculation and display of the roll position of the orientation sensor.

The roll sensing configuration disclosed in FIG. 7 herein may be modified in an unlimited number of ways according to the present invention. For example, any number of two or more roll sensing gaps may be utilized. In the instance where only roll is dynamically measured, as little as a single roll sensing gap is useful. For example, a roll sensing gap (not shown) may be configured including a varying, known width which surrounds the center of rotation of roll of the orientation sensor. Dynamic analysis of the output from such a sensing gap can be used to uniquely identify any particular roll position. In this regard, any combination or configuration of the roll sensing gaps which uniquely identifies roll position of the orientation sensor is useful whether operable in static or dynamic conditions. Another possible modification resides in providing printed circuit boards having sensing gaps of different configurations (not shown) at either end of chamber 106 or, alternatively, identical patterns offset with respect to one another may be provided at either end of chamber 110. In this way, two roll sensing gaps may be used to uniquely identify the static roll position of orientation sensor 100.

Because the orientation sensor disclosed herein may be provided in a variety of different configurations and modified in an unlimited number of different ways, it should be understood that the present invention may be embodied in many other specific forms without departing from the spirit or scope of the invention. For example, electrically conductive patterns may be provided in forms other than as electrically conductive traces on a printed circuit board. In one such alternative, relatively rigid grid wires (not shown) may be used wherein the flowable medium may flow around and between the grid wires. Therefore, the present examples and methods are to be considered as illustrative and not restrictive, and the invention is not to be limited to the details given herein, but may be modified within the scope of the appended claims.

What is claimed is:

1. An orientation sensor capable of generating at least one output signal indicative of a particular orientation parameter, said sensor comprising:

(a) a sensor housing defining a closed internal chamber including a first internal surface;

(b) a sensing arrangement including a first electrically conductive pattern supported by said first internal surface and defining an arrangement of electrically isolated segments in a predetermined configuration; and (c) a flowable material contained within said internal chamber, which flowable material contacts a portion of said first internal surface, which portion is dependent upon the value of said particular orientation parameter in a way which influences an electrical property measurable between the segments such that said orientation parameter can be determined using said output signal based only on the electrical property and, therefore, only on the portion of said first internal surface contacted by said flowable material.

2. The orientation sensor of claim 1 wherein said flowable material is electrically conductive and wherein said electrical property is the electrical conductivity of the flowable material between the segments of said first electrically conductive pattern.

3. The orientation sensor of claim 1 wherein said flowable material is suitable for use as a dielectric and wherein said measurable property is capacitance between the segments of said first electrically conductive pattern which varies based upon the presence of said flowable material in contact with said first internal surface.

4. The orientation sensor of claim 1 wherein said particular orientation parameter is pitch and wherein said first electrically conductive pattern includes first and second electrically isolated segments defining a gap therebetween on said first internal surface such that the value of said electrical property is in proportion to an area of said gap covered by said flowable material between said first and second segments which, in turn, is in proportion to said pitch so as to cause the value of said property between the first and second segments to change responsive to the pitch.

5. The orientation sensor of claim 4 wherein the orientation sensor may be subjected to roll about an axis that intersects said first internal surface at one point and wherein said gap is formed continuously surrounding said axis such that the electrical property is unaffected by said roll and, therefore, the output signal for use in determining said pitch is provided irrespective of said roll.

6. The orientation sensor of claim 5 wherein said axis is substantially normal to said first internal surface and wherein said gap is configured for providing a continuous output signal for a fixed value of said pitch irrespective of said roll.

7. The orientation sensor of claim 6 wherein said gap is circular in form having a center located at said point.

8. The orientation sensor of claim 1 wherein said particular orientation parameter is roll angle and wherein said first electrically conductive pattern includes at least first and second electrically isolated segments defining a first roll sensing gap therebetween on said first internal surface such that the value of said electrical property is in proportion to an area of said roll sensing gap covered by said flowable material between said first and second segments which, in turn, is in proportion to said roll so as to cause the value of said property between the first and second segments to change responsive to the roll.

9. The orientation sensor of claim 8 wherein roll occurs about an axis that intersects said first internal surface at one point and wherein said first segment is arranged in proximity to the second segment so that measurement of said property between said first segment and said second segment produces a first output signal for use in establishing said roll angle.

10. The orientation sensor of claim 9 wherein said first segment surrounds said point on said first internal surface and wherein said second segment cooperates with said first segment to define said first roll sensing gap such that the first roll sensing gap only partially surrounds said point.

11. The orientation sensor of claim 9 wherein said first roll sensing gap is in the form of an arc having a radius centered at said point.

12. The orientation sensor of claim 9 wherein said first electrically conductive pattern includes third and fourth electrically isolated segments, said third and fourth segments being arranged in proximity to the first and second segments and one another so as to define a second roll sensing gap between the first and third segments and a third roll sensing gap between the first and fourth segments such that areas of said second and third gaps are covered by said flowable material in proportion to variation of said roll angle and measurement of said property from said first segment to said third segment produces a second output signal while measurement of said property from said first segment to said fourth segment produces a third output signal for use in establishing the roll angle.

13. The orientation sensor of claim 12 wherein said first, second and third output signals are each different from the others for any particular roll angle such that the first, second and third output signals uniquely identify any particular roll position.

14. The orientation sensor of claim 13 wherein said first segment surrounds said point on said first internal surface and wherein said second, third and fourth segments cooperate with said first segment to define said first, second and third roll sensing gaps such that each gap is contacted by said flowable medium across a different range of roll angles.

15. The orientation sensor of claim 14 wherein the different ranges of said roll angles substantially surround said point.

16. The orientation sensor of claim 15 wherein the range of roll angles covered by each roll sensing gap is equal to approximately 120°.

17. The orientation sensor of claim 1 wherein said sensor housing defines a second internal surface opposing said first internal surface and said sensing arrangement includes a second electrically conductive pattern supported by said second internal surface and defining another arrangement of electrically isolated segments such that said flowable material also contacts a portion of said second internal surface dependent upon the value of said particular orientation parameter to influence said property measurable between the segments on the second surface so as to produce at least one other output signal such that the one output signal produced by the first electrically conductive pattern is independent of the other output signal produced by the second electrically conductive pattern for use in establishing the value of said orientation parameter.

18. The orientation sensor of claim 17 wherein the first and second electrically conductive patterns are identical in configuration and orientation such that combined use of the output signals to determine the value of said orientation parameter produces ratiometric cancellation of temperature error.

19. An orientation sensor capable of generating at least two output signals indicative of a particular orientation parameter, said sensor comprising:

(a) a sensor housing defining a closed internal chamber having first and second opposing internal surfaces;

(b) a first electrically conductive pattern supported by said first internal surface and defining a first plurality of electrically isolated segments in a first predetermined configuration;

(c) a second electrically conductive pattern supported by said second internal surface and defining a second plurality of electrically isolated segments in a second predetermined configuration; and (d) a flowable material contained within said internal chamber which flowable material contacts first and second portions, respectively, of said first and second internal surfaces, which first and second portions are dependent upon the value of said particular orientation parameter in a way which influences an electrical property measurable between the segments disposed on the first and second surfaces such that the first electrically conductive pattern produces at least a first output signal and the second electrically conductive pattern produces at least a second output signal in proportion to the first and second portions of the first and second internal surfaces respectively contacted and such that each pattern produces its output signal substantially independent of the other pattern based on contact with said flowable material.

20. The orientation sensor of claim 19 wherein the first and second electrically conductive patterns are identical and identically oriented such that combined use of the output signals to determine the value of said orientation parameter produces ratiometric cancellation of temperature error.

21. A combination pitch and roll orientation sensor capable of generating output signals indicative of the pitch and roll orientation of the sensor, said sensor comprising:

(a) a sensor housing defining a closed internal chamber including a first internal surface;

(b) a sensing arrangement including a first electrically conductive pattern supported by said first internal surface and defining an arrangement of electrically isolated segments in a predetermined configuration such that a first combination of said segments is configured for use in measuring the pitch orientation of the sensor and a second combination of said segments is configured for use in measuring the roll orientation of the sensor; and (c) a flowable material contained within said internal chamber which flowable material contacts a portion of said first internal surface dependent upon both said pitch and roll orientation in a way which influences an electrical property measurable between the first combination of segments so as to produce at least one pitch output signal for use in determining said pitch and measurable between the second combination of segments so as to produce at least one roll output signal for use in determining said roll.

22. The orientation sensor of claim 21 wherein said first combination of segments includes first and second electrically isolated segments defining a pitch sensing gap therebetween on said first internal surface such that an area of said pitch sensing gap covered by said flowable material between said first and second segments is in proportion to said pitch so as to cause the value of said electrical property between the first and second segments to change responsive to the pitch.

23. The orientation sensor of claim 22 wherein the orientation sensor may be subjected to roll about an axis that passes through said first internal surface and wherein said pitch sensing gap is formed continuously surrounding said axis such that the output signal for use in determining said pitch is provided irrespective of said roll.

24. The orientation sensor of claim 23 wherein said axis is substantially normal to said first internal surface so as to pass through a particular point on the first internal surface and wherein said pitch sensing gap is configured for providing a continuous output signal for a fixed value of said pitch, irrespective of said roll.

25. The orientation sensor of claim 24 wherein said pitch sensing gap is circular in form having a center located at said particular point and wherein said second segment surrounds said first segment to define said pitch sensing gap.

26. The orientation sensor of claim 24 wherein said second combination of electrically conductive segments includes at least a third electrically isolated segment defining a first roll sensing gap between the third segment and the second segment on said first internal surface such that an area of said first roll sensing gap covered by said flowable material between said second and third segments is in proportion to said roll angle so as to cause the value of said electrical property between the second and third segments to change responsive to changes in the roll angle.

27. The orientation sensor of claim 26 wherein roll occurs about an axis that intersects said first internal surface at one point and wherein said third segment is arranged in proximity to the second segment so that measurement of said electrical property between said second segment and said third segment produces a first roll output signal for use in establishing said roll angle.

28. The orientation sensor of claim 27 wherein said second segment surrounds said point on said first internal surface and wherein said third segment cooperates with said second segment to define said first roll sensing gap such that the first roll sensing gap only partially surrounds said point.

29. The orientation sensor of claim 28 wherein said first roll sensing gap is in the form of an arc having a radius centered at said point.

30. The orientation sensor of claim 28 wherein said first electrically conductive pattern includes fourth and fifth electrically isolated segments, said fourth and fifth segments being arranged in proximity to the first, second and third segments and one another so as to define a second roll sensing gap between the second and fourth segments and a third roll sensing gap between the second and fifth segments such that areas of said second and third roll sensing gaps are covered by said flowable material in proportion to variation of said roll angle and measurement of said electrical property from said second segment to said fourth segment produces a second roll output signal while measurement of said property from said second segment to said fifth segment produces a third roll output signal for use in establishing the roll angle.

31. The orientation sensor of claim 30 wherein said first, second and third output signals are each different from the others for any particular roll angle such that the first, second and third roll output signals uniquely identify any particular roll angle.

32. The orientation sensor of claim 31 wherein said second segment surrounds said point on said first internal surface and wherein said third, fourth and fifth segments cooperate with said second segment to define said first, second and third roll sensing gaps such that each roll sensing gap is contacted by said flowable medium across a different range of roll angles.

33. The orientation sensor of claim 32 wherein the different ranges of said roll angles substantially surround said point.

34. The orientation sensor of claim 33 wherein the range of roll angles covered by each roll sensing gap is equal to approximately 120°.

35. The orientation sensor of claim 21 wherein said second combination of electrically conductive segments includes at least first and second electrically isolated segments defining a first roll sensing gap therebetween on said first internal surface such that an area of said first roll sensing gap covered by said flowable material between said first and second segments is in proportion to said roll angle so as to cause the value of said electrical property between the first and second segments to change responsive to changes in the roll angle.

36. The orientation sensor of claim 21 wherein said sensor housing defines a second internal surface opposing said first internal surface and said sensing arrangement includes a second electrically conductive pattern supported by said second internal surface and defining another arrangement of electrically isolated segments including said predetermined configuration having said first and second combinations of said segments such that said flowable material contacts a portion of said second internal surface dependent upon the value of said particular orientation to influence said electrical property measurable between the segments on the second surface so as to produce at least one other pitch output signal and one other roll output signal such that pitch and roll output signals produced by the first electrically conductive pattern are independent of the pitch and roll output signals produced by the second electrically conductive pattern for use in establishing the value of said orientation.

37. The orientation sensor of claim 36 wherein the first and second electrically conductive patterns are identical in configuration and orientation such that combined use of the output signals generated by the first and second electrically conductive patterns for determining the value of said orientation produces ratiometric cancellation of temperature error.

38. A combination pitch/roll sensor comprising:
   a) a housing defining an internal surface and containing a flowable material which flows in the housing contacting the internal surface in response to the pitch and roll orientation of the housing; and
   b) an electrical arrangement including a single electrically conductive pattern on said internal surface which cooperates with said material so as to produce independent electrical signals corresponding to the pitch and roll of said housing.

39. The pitch/roll sensor of claim 38 wherein said electrically conductive pattern is made up of a plurality of electrically isolated conductive segments such that a first combination of the segments provides a pitch signal based on contact of the flowable material with the first combination of segments and a second combination of segments provides at least one roll signal based on contact of the flowable material with the second combination of segments.

40. The pitch/roll sensor of claim 39 wherein the first and second combinations of segments define pitch and roll sensing gaps respectively such that a particular electrical property is measurable between the segments and across the pitch and roll sensing gaps, and the particular property is influenced by contact of the flowable material with the pitch and roll sensing gaps for use in determining the pitch and roll.

41. The pitch/roll sensor of claim 40 wherein said electrical property is electrical conductivity.

42. The pitch/roll sensor of claim 40 wherein said electrical property is electrical capacitance.

* * * * *